United States Patent
Kim et al.

(10) Patent No.: US 10,886,560 B2
(45) Date of Patent: Jan. 5, 2021

(54) ALL-SOLID-STATE LITHIUM SECONDARY BATTERY CONTAINING LLZO SOLID ELECTROLYTE AND METHOD FOR PREPARING SAME

(71) Applicant: KOREA INSTITUTE OF INDUSTRIAL TECHNOLOGY, Cheonan-si (KR)

(72) Inventors: Ho Sung Kim, Gwangju (KR); Min-Young Kim, Gwangju (KR); Seung Hoon Yang, Gwangju (KR); Da-Hye Kim, Gwangju (KR); Kyeong Joon Kim, Gwangju (KR); Seung Woo Choi, Gwangju (KR); Jinsub Lim, Gwangju (KR); Duck Rye Chang, Gwangju (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 191 days.

(21) Appl. No.: 16/072,571

(22) PCT Filed: Nov. 15, 2016

(86) PCT No.: PCT/KR2016/013120
§ 371 (c)(1),
(2) Date: Jul. 25, 2018

(87) PCT Pub. No.: WO2017/135553
PCT Pub. Date: Aug. 10, 2017

(65) Prior Publication Data
US 2019/0051934 A1    Feb. 14, 2019

(30) Foreign Application Priority Data
Feb. 3, 2016  (KR) .................. 10-2016-0013381

(51) Int. Cl.
*H01M 10/0562*   (2010.01)
*H01M 10/052*   (2010.01)
(Continued)

(52) U.S. Cl.
CPC ......... *H01M 10/0562* (2013.01); *H01M 4/62* (2013.01); *H01M 10/052* (2013.01);
(Continued)

(58) Field of Classification Search
CPC .......... H01M 10/052; H01M 10/0562; H01M 10/058; H01M 2300/0082;
(Continued)

(56) References Cited

U.S. PATENT DOCUMENTS

2004/0161667 A1*  8/2004  Fukuzawa ......... H01M 10/0525
                                                                429/210
2014/0154586 A1   6/2014  Hayashi et al.
(Continued)

FOREIGN PATENT DOCUMENTS

JP    2014-110149 A    6/2014
JP    2015-088480 A    5/2015
(Continued)

OTHER PUBLICATIONS

Yasuaki Matsuda et al., "Phase Transformation of Garnet-Type Lithium-Ion Conductor $Li_7La_3Zr_2O_{12}$", The Japan Society of Calorimetry and Thermal Analysis, 2015, vol. 42, No. 2.
(Continued)

*Primary Examiner* — Adam A Arciero
(74) *Attorney, Agent, or Firm* — Rabin & Berdo, P.C.

(57) ABSTRACT

The present invention relates to an all-solid-state lithium secondary battery and a method of manufacturing the same. The all-solid-state lithium secondary battery includes a cathode, an anode, and a composite solid electrolyte layer between the cathode and the anode, wherein first and second
(Continued)

LLZOs contained respectively in the cathode and the composite solid electrolyte layer are each independently aluminum-doped or undoped LLZO, and the battery of the invention can exhibit improved discharge capacity and cycle characteristics because both the cathode and the composite solid electrolyte layer contain a conductive polymer, a lithium salt and an inorganic ceramic solid electrolyte. The method of the invention enables the all-solid-state lithium secondary battery to be manufactured in a non-sintering manner, thus reducing manufacturing costs and controlling interfacial reactions between active materials, between solid electrolyte particles, and between an electrolyte and an electrode, thereby further reducing the internal resistance of the battery.

14 Claims, 6 Drawing Sheets

(51) Int. Cl.
  *H01M 4/62* (2006.01)
  *H01M 10/058* (2010.01)
  *H01M 4/505* (2010.01)
  *H01M 4/525* (2010.01)
(52) U.S. Cl.
  CPC .......... *H01M 10/058* (2013.01); *H01M 4/505* (2013.01); *H01M 4/525* (2013.01); *H01M 2300/0082* (2013.01); *H01M 2300/0091* (2013.01)

(58) Field of Classification Search
  CPC ......... H01M 2300/0091; H01M 4/505; H01M 4/525; H01M 4/62
  See application file for complete search history.

(56) References Cited

U.S. PATENT DOCUMENTS

| | | |
|---|---|---|
| 2014/0287305 A1 | 9/2014 | Wachsman et al. |
| 2014/0377655 A1 | 12/2014 | Mun et al. |
| 2015/0099188 A1* | 4/2015 | Holme ................ C04B 35/6262 429/231.95 |
| 2015/0221952 A1* | 8/2015 | Ma .................... H01M 10/0562 429/405 |

FOREIGN PATENT DOCUMENTS

| | | |
|---|---|---|
| KR | 10-2012-0132533 A | 12/2012 |
| KR | 10-2014-0006715 A | 1/2014 |
| KR | 10-2015-0000564 A | 1/2015 |
| KR | 10-2015-0041217 A | 4/2015 |
| KR | 10-2015-0125810 A | 11/2015 |
| KR | 10-2015-0129181 A | 11/2015 |
| KR | 10-2015-0138267 A | 12/2015 |
| WO | WO 2015/054320 A2 | 4/2015 |

OTHER PUBLICATIONS

Japanese Office Action dated Jun. 14, 2018.

* cited by examiner

ALL-SOLID-STATE LITHIUM SECONDARY BATTERY CONTAINING LLZO SOLID ELECTROLYTE AND METHOD FOR PREPARING SAME

TECHNICAL FIELD

The present invention relates to an all-solid-state lithium secondary battery containing an LLZO solid electrolyte and a method of manufacturing the same. More particularly, the present invention relates to an all-solid-state lithium secondary battery containing an LLZO solid electrolyte, in which both a cathode and a composite solid electrolyte layer contain a conductive polymer, a lithium salt and an inorganic ceramic solid electrolyte, and to a method of manufacturing the same.

BACKGROUND ART

Since lithium secondary batteries have large electrochemical capacity, high operating potential and excellent charge/discharge cycle characteristics, there is increasing demand thereof for applications such as portable information terminals, portable electronic devices, small-sized power storage devices for home use, motorcycles, electric vehicles, hybrid electric vehicles, etc. Due to the spread of such applications, improved safety and increasingly high performance of lithium secondary batteries are required.

Conventional lithium secondary batteries use a liquid electrolyte and are readily ignited when exposed to water in the air, thus posing a safety problem. This safety issue is becoming more important as electric vehicles become more commercially viable.

Hence, recently, thorough research into an all-solid-state secondary battery using a solid electrolyte formed of a non-combustible inorganic material for the purpose of safety improvement is ongoing. An all-solid-state secondary battery is receiving attention as a next-generation secondary battery with the goals of improved safety, high energy density, high power output, long life, simplification of manufacturing processes, formation of large/compact batteries, and reduced costs.

The key technology of the all-solid-state secondary battery is to develop a solid electrolyte that exhibits high ionic conductivity. Examples of a solid electrolyte for an all-solid-state secondary battery known to date include a sulfide solid electrolyte and an oxide solid electrolyte.

Korean Patent Application Publication No. 2012-0132533 discloses an all-solid-state lithium secondary battery having superior power output characteristics using a sulfide-based solid electrolyte as an electrolyte. However, the sulfide solid electrolyte is problematic in that hydrogen sulfide ($H_2S$) gas, which is toxic, is generated.

An oxide solid electrolyte exhibits low ionic conductivity compared to a sulfide solid electrolyte, but is receiving attention these days because of the high stability thereof. However, a conventional oxide-based solid electrolyte results in increased internal resistance of the battery due to an interfacial reaction between an electrolyte and an electrode, thus deteriorating cell discharge capacity and cycle characteristics, which is undesirable.

DISCLOSURE

Technical Problem

Accordingly, the present invention is intended to provide an all-solid-state lithium secondary battery, in which both a cathode and a composite solid electrolyte layer contain a conductive polymer, a lithium salt and an inorganic ceramic solid electrolyte (LLZO), thus improving discharge capacity and cycle characteristics.

In addition, the present invention is intended to provide a method of manufacturing an all-solid-state lithium secondary battery, in which the all-solid-state lithium secondary battery including a cathode and a composite solid electrolyte layer, both of which contain a conductive polymer, a lithium salt and an inorganic ceramic solid electrolyte, is manufactured in a non-sintering manner, thus reducing manufacturing costs and controlling interfacial reactions between active materials, between solid electrolyte particles, and between an electrolyte and an electrode, thereby further reducing the internal resistance of the battery.

Technical Solution

Therefore, an aspect of the present invention provides an all-solid-state lithium secondary battery, comprising: a cathode containing a cathode active material, a first LLZO, a first conductive polymer, a first lithium salt and a conductive material; an anode containing lithium metal; and a composite solid electrolyte layer disposed between the cathode and the anode and configured to contain a second LLZO, a second conductive polymer and a second lithium salt, wherein the first LLZO and the second LLZO are each independently aluminum-doped LLZO or aluminum-undoped LLZO, the undoped LLZO is represented by Chemical Formula 1 below, and the doped LLZO is represented by Chemical Formula 2 below.

$$Li_xLa_yZr_zO_{12} (6 \leq x \leq 9, 2 \leq y \leq 4, 1 \leq z \leq 3) \quad \text{[Chemical Formula 1]}$$

$$Li_xLa_yZr_zAl_wO_{12} (5 \leq x \leq 9, 2 \leq y \leq 4, 1 \leq z \leq 3, 0 < w \leq 1) \quad \text{[Chemical Formula 2]}$$

The first LLZO and the second LLZO may each be independently aluminum-doped LLZO.

The aluminum-doped LLZO may have a garnet crystal structure.

The cathode may include, based on 100 parts by weight of the cathode active material, 5 to 50 parts by weight of the first LLZO, 5 to 25 parts by weight of the first conductive polymer, and 5 to 25 parts by weight of the conductive material, and the composite solid electrolyte layer may include, based on 100 parts by weight of the second LLZO, 1 to 300 parts by weight of the conductive polymer.

The first conductive polymer and the second conductive polymer may each independently include at least one selected from the group consisting of polyethylene oxide, polyethylene glycol, polypropylene oxide, polyphosphazene, polysiloxane and copolymers thereof.

Each of the first conductive polymer and the second conductive polymer may independently be polyethylene oxide having an average molecular weight of 500 to 1,000,000.

The cathode active material may be a Ni—Co—Mn ternary lithium metal oxide (NMC) represented by Chemical Formula 3 below.

$$LiNi_pCo_qMn_rO_2 \quad \text{[Chemical Formula 3]}$$

In Chemical Formula 3, $0<p<0.9$, $0<q<0.5$, $0<r<0.5$, and $p+q+r=1$.

The conductive material may include at least one conductive carbon selected from among carbon black, acetylene black, and KETJENBLACK by AKZO-NOBEL.

Each of the first lithium salt and the second lithium salt may independently be at least one selected from among lithium perchlorate (LiClO$_4$), lithium triflate (LiCF$_3$SO$_3$), lithium hexafluorophosphate (LiPF$_6$), lithium tetrafluoroborate (LiBF$_4$), and lithium trifluoromethanesulfonyl imide (LiN(CF$_3$SO$_2$)$_2$).

The all-solid-state lithium secondary battery may include a cathode containing aluminum-doped LLZO, polyethylene oxide, a Ni—Co—Mn ternary lithium metal oxide (NMC), lithium perchlorate (LiClO$_4$) and carbon black, an anode containing lithium metal, and a composite solid electrolyte layer disposed between the cathode and the anode and configured to contain aluminum-doped LLZO, polyethylene oxide and lithium perchlorate (LiClO$_4$).

Another aspect of the present invention provides a method of manufacturing an all-solid-state lithium secondary battery, comprising: (a) manufacturing a cathode containing a cathode active material, a first LLZO, a first conductive polymer, a first lithium salt and a conductive material; (b) manufacturing a composite solid electrolyte layer containing a second LLZO, a second conductive polymer and a second lithium salt; (c) manufacturing a stack by stacking the cathode and the composite solid electrolyte layer; and (d) disposing an anode containing lithium metal on the composite solid electrolyte layer of the stack.

In the method of manufacturing the all-solid-state lithium secondary battery, step (c) may be performed in a manner in which the cathode and the composite solid electrolyte layer are stacked and pressurized at a pressure of 0.1 to 1.0 MPa in a temperature range (T) of Expression 1 below, thus manufacturing the stack.

$$T_m \leq T \leq T_m + 50° \text{ C.} \quad [\text{Expression 1}]$$

In Expression 1, $T_m = T_{m1}$ when $T_{m1} > T_{m2}$, $T_m = T_{m2}$ when $T_{m1} < T_{m2}$, and $T_m = T_{m1}$ when $T_{m1} = T_{m2}$.

Here, $T_{m1}$ is a melting temperature of the first conductive polymer and $T_{m2}$ is a melting temperature of the second conductive polymer.

The first conductive polymer and the second conductive polymer may be polyethylene oxide, and step (c) may be performed in a manner in which the cathode and the composite solid electrolyte layer are stacked and pressurized at a pressure of 0.1 to 1.0 MPa at a temperature of 65° C. (the melting temperature of polyethylene oxide) to 115° C., thus manufacturing the stack.

The method of manufacturing the all-solid-state lithium secondary battery may further include pressurizing the product of step (d) at a pressure of 0.1 to 1.0 MPa in a temperature range (T) of Expression 1 below.

$$T_m \leq T \leq T_m + 50° \text{ C.} \quad [\text{Expression 1}]$$

In Expression 1, $T_m = T_{m1}$ when $T_{m1} > T_{m2}$, $T_m = T_{m2}$ when $T_{m1} < T_{m2}$, and $T_m = T_{m1}$ when $T_{m1} = T_{m2}$.

Here, $T_{m1}$ is a melting temperature of the first conductive polymer and $T_{m2}$ is a melting temperature of the second conductive polymer.

Step (a) may be performed in a manner in which the cathode active material, the LLZO, the first conductive polymer, the first lithium salt and the conductive material are mixed to give a slurry, and the slurry is cast and then dried, thus manufacturing the cathode.

Still another aspect of the present invention provides a method of manufacturing an all-solid-state lithium secondary battery, comprising: (a') manufacturing a cathode containing a cathode active material, a first LLZO, a first conductive polymer, a first lithium salt and a conductive material; (b') manufacturing a composite solid electrolyte layer containing a second LLZO, a second conductive polymer and a second lithium salt; (c') manufacturing a stack by disposing the cathode, the composite solid electrolyte layer on the cathode, and an anode containing lithium metal on the composite solid electrolyte layer; and (d') manufacturing an all-solid-state lithium secondary battery by pressurizing the stack at a pressure of 0.1 to 1.0 MPa in a temperature range (T) of Expression 1 below.

$$T_m \leq T \leq T_m + 50° \text{ C.} \quad [\text{Expression 1}]$$

In Expression 1, $T_m = T_{m1}$ when $T_{m1} > T_{m2}$, $T_m = T_{m2}$ when $T_{m1} < T_{m2}$, and $T_m = T_{m1}$ when $T_{m1} = T_{m2}$.

Here, $T_{m1}$ is a melting temperature of the first conductive polymer and $T_{m2}$ is a melting temperature of the second conductive polymer.

Advantageous Effects

Unlike the related art, an all-solid-state lithium secondary battery according to the present invention is configured such that both a cathode and a composite solid electrolyte layer contain a conductive polymer, a lithium salt and an inorganic ceramic solid electrolyte, thus improving the discharge capacity and cycle characteristics of the battery.

In addition, in a method of manufacturing an all-solid-state lithium secondary battery according to the present invention, the all-solid-state lithium secondary battery including a cathode and a composite solid electrolyte layer, both of which contain a conductive polymer, a lithium salt and an inorganic ceramic solid electrolyte, is manufactured in a non-sintering manner, thus reducing manufacturing costs and controlling interfacial reactions between active materials, between solid electrolyte particles, and between an electrolyte and an electrode, thereby further reducing the internal resistance of the battery.

BEST MODE

Hereinafter, embodiments of the present invention are described in detail with reference to the appended drawings so as to be easily performed by a person having ordinary skill in the art.

However, the following description does not limit the present invention to specific embodiments, and moreover, descriptions of known techniques, even if they are pertinent to the present invention, are considered unnecessary and may be omitted insofar as they would make the characteristics of the invention unclear.

The terms herein are used to explain specific embodiments and are not intended to limit the present invention. Unless otherwise stated, the singular expression includes a plural expression. In this application, the terms "include" or "have" are used to designate the presence of features, numbers, steps, operations, elements, or combinations thereof described in the specification, and should be understood as not excluding the presence or additional possibility of one or more different features, numbers, steps, operations, elements, or combinations thereof.

Figure 1:
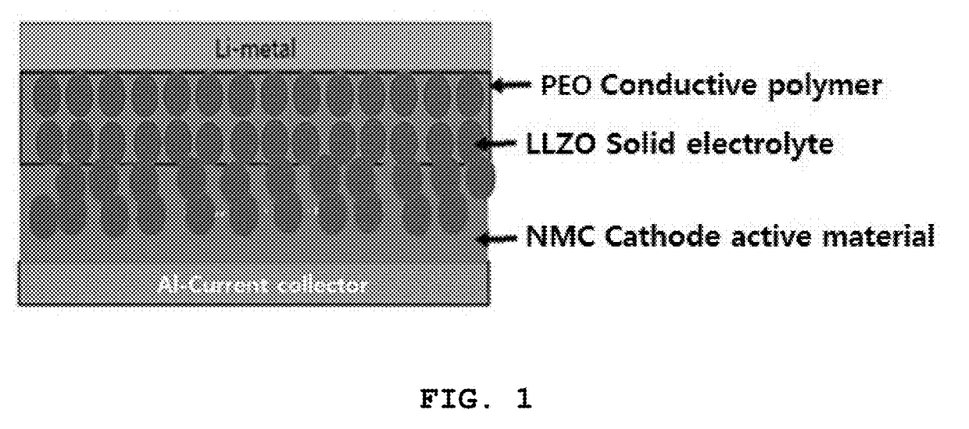
FIG. 1 schematically shows an all-solid-state lithium secondary battery according to the present invention.

FIG. 1 schematically shows an all-solid-state lithium secondary battery according to the present invention, which is exemplarily configured such that a first conductive polymer and a second conductive polymer are PEO, a cathode active material is a Ni—Co—Mn ternary lithium metal oxide (NMC), and an aluminum current collector and a lithium metal anode are stacked, but the present invention is not limited thereto.

Below is a description of an all-solid-state lithium secondary battery according to the present invention, made with reference to FIG. 1, which is merely set forth to illustrate but is not to be construed as limiting the present invention, and the present invention will be defined by the accompanying claims.

According to the present invention, the all-solid-state lithium secondary battery may include a cathode containing a cathode active material, a first LLZO, a first conductive polymer, a first lithium salt and a conductive material, an anode containing lithium metal, and a composite solid electrolyte layer disposed between the cathode and the anode and configured to contain a second LLZO, a second conductive polymer and a second lithium salt.

Each of the first and second LLZOs may independently be aluminum-doped or aluminum-undoped LLZO, and the undoped LLZO may be represented by Chemical Formula 1 below, and the doped LLZO may be represented by Chemical Formula 2 below.

[Chemical Formula 1]

$Li_xLa_yZr_zO_{12} (6 \leq x \leq 9, 2 \leq y \leq 4, 1 \leq z \leq 3)$

[Chemical Formula 2]

$Li_xLa_yZr_zAl_wO_{12} (5 \leq x \leq 9, 2 \leq y \leq 4, 1 \leq z \leq 3, 0 < w \leq 1)$ Preferably, the first and second LLZOs are aluminum-doped LLZO, and the aluminum-doped LLZO has a garnet crystal structure. The garnet crystal structure exhibits high ionic conductivity and superior potential stability.

The cathode may include 100 parts by weight of a cathode active material, 5 to 50 parts by weight of a first LLZO, 5 to 25 parts by weight of a first conductive polymer, and 5 to 25 parts by weight of a conductive material.

In the cathode, the first conductive polymer is preferably contained in an amount of 5 to 30 parts by weight based on 100 parts by weight of the cathode active material, and more preferably, the first conductive polymer is contained in an amount of 10 to 20 parts by weight based on 100 parts by weight of the cathode active material.

The cycle characteristics of the all-solid-state lithium secondary battery may be improved depending on the amount of the cathode active material contained in the cathode, and preferably, the first LLZO is contained in an amount of 10 to 40 parts by weight based on 100 parts by weight of the cathode active material.

The composite solid electrolyte layer may include 1 to 300 parts by weight of the second conductive polymer based on 100 parts by weight of the second LLZO, preferably 1 to 280 parts by weight of the second conductive polymer based on 100 parts by weight of the second LLZO, and more preferably, 1 to 250 parts by weight of the second conductive polymer based on 100 parts by weight of the second LLZO.

Each of the first conductive polymer and the second conductive polymer may independently include polyethylene oxide, polyethylene glycol, polypropylene oxide, polyphosphazene, polysiloxane and copolymers thereof. Preferably, polyethylene oxide having an average molecular weight of 500 to 1,000,000, more preferably polyethylene oxide having an average molecular weight of 1,000 to 400,000, and even more preferably polyethylene oxide having an average molecular weight of 5,000 to 300,000 is used.

Both the cathode and the composite solid electrolyte layer contain the LLZO and the conductive polymer, thus enhancing interfacial properties between active material particles, between solid electrolyte particles, and between an electrolyte layer and an electrode, thereby improving the discharge capacity and cycle characteristics of the all-solid-state lithium secondary battery.

More specifically describing the conductive polymer, a conductive polymer typically indicates a polymer having conductivity of at least $10^{-7}$ Scm$^{-1}$ (equal to or greater than that of a semiconductor), and in most cases, a polymer is doped with an electron acceptor or an electron donor to thus obtain high conductivity. The doped polyethylene, polypyrrole, polythiophene, and the like are known to be typical conductive polymers. In the present invention, the choice of a conductive polymer that may be complexed with a lithium salt to attain optimal ionic conductivity is preferable, and polyethylene oxide is preferably used.

Examples of the cathode active material may include, but are not limited to, at least one transition metal-substituted compound or a lamellar compound, such as lithium cobalt oxide ($LiCoO_2$), lithium nickel oxide ($LiNiO_2$), etc.; lithium manganese oxide represented by $Li_{1+x}Mn_{2-x}O_4$ (wherein x is 0 to 0.33), such as $LiMnO_3$, $LiMn_2O_3$, $LiMnO_2$, etc.; lithium copper oxide ($Li_2CuO_2$); vanadium oxide, such as $LiV_3O_8$, $LiFe_3O_4$, $V_2O_5$, $Cu_2V_2O_7$, etc.; Ni site-type lithium nickel oxide represented by $LiNi_{1-x}M_xO_2$ (wherein M is Co, Mn, Al, Cu, Fe, Mg, B or Ga, and x is 0.01 to 0.3); lithium manganese composite oxide represented by $LiMn_{2-x}M_xO_2$ (wherein M is Co, Ni, Fe, Cr, Zn or Ta, and x is 0.01 to 0.1) or $Li_2Mn_3MO_8$ (wherein M is Fe, Co, Ni, Cu or Zn); $LiMn_2O_4$, a portion of the Li of which is substituted with an alkaline earth metal ion; a disulfide compound; $Fe_2(MoO_4)_3$; and $Li[Ni_{1/3}Co_{1/3}Mn_{1/3}O]_2$ represented by $Li[Ni_xCo_{1-2x}Mn_xO]_2$ (0<x<0.5), which is a Ni—Co—Mn ternary lithium metal oxide (NMC).

The cathode active material is preferably a Ni—Co—Mn ternary lithium metal oxide (NMC) represented by Chemical Formula 3 below.

[Chemical Formula 3]

$LiNi_pCo_qMn_rO_2$

In Chemical Formula 3, 0<p<0.9, 0<q<0.5, 0<r<0.5, and p+q+r=1.

The conductive material may include carbon black, acetylene black, KETJENBLACK by AKZO-NOBEL, and the like, and is preferably carbon black.

The first lithium salt and the second lithium salt are each independently lithium perchlorate ($LiClO_4$), lithium triflate (LiCF$_3$SO$_3$), lithium hexafluorophosphate (LiPF$_6$), lithium tetrafluoroborate (LiBF$_4$), lithium trifluoromethanesulfonyl imide (LiN(CF$_3$SO$_2$)$_2$), and the like, and are preferably lithium perchlorate.

The all-solid-state lithium secondary battery preferably includes a cathode containing aluminum-doped LLZO, polyethylene oxide, Ni—Co—Mn ternary lithium metal oxide (NMC), lithium perchlorate (LiClO$_4$) and carbon black; an anode containing lithium metal; and a composite solid electrolyte layer disposed between the cathode and the anode and configured to contain aluminum-doped LLZO, polyethylene oxide and lithium perchlorate (LiClO$_4$).

Below, a method of manufacturing an all-solid-state lithium secondary battery according to the present invention is described in detail.

First, a cathode containing a cathode active material, a first LLZO, a first conductive polymer, a first lithium salt and a conductive material is manufactured (step a).

Specifically, a slurry containing the cathode active material, the first LLZO, the first conductive polymer, the first lithium salt and the conductive material, which are mixed together, is cast and then dried, thus manufacturing a cathode.

Next, a composite solid electrolyte layer containing a second LLZO, a second conductive polymer and a second lithium salt is manufactured (step b).

Specifically, a substrate is coated with a composite solid electrolyte mixture containing the second LLZO, the second conductive polymer and the lithium salt, thus manufacturing a composite solid electrolyte layer.

The substrate may include PET (polyethylene terephthalate), PEN (polyethylene naphthalate), PES (polyether sulfone), PC (polycarbonate), PP (polypropylene), or the like, and is preferably PET.

The coating process may be performed without limitation, so long as it does not damage the substrate.

Next, a stack is manufactured by stacking the cathode and the composite solid electrolyte layer (step c).

Preferably, the cathode and the composite solid electrolyte layer are stacked and pressurized at a pressure of 0.1 to 1.0 MPa in the temperature range (T) of Expression 1 below, thus manufacturing the stack.

$$T_m \leq T \leq T_m + 50° \text{C}. \quad \text{[Expression 1]}$$

In Expression 1, $T_m = T_{m1}$ when $T_{m1} > T_{m2}$, $T_m = T_{m2}$ when $T_{m1} < T_{m2}$, and $T_m = T_{m1}$ when $T_{m1} = T_{m2}$.

Here, $T_{m1}$ is a melting temperature of the first conductive polymer and $T_{m2}$ is a melting temperature of the second conductive polymer.

The pressurization process is preferably performed at a pressure of 0.1 to 1.0 MPa, more preferably 0.1 to 0.8 MPa, and still more preferably 0.2 to 0.4 MPa.

The pressurization process is performed for 5 sec to 5 min, preferably 5 sec to 3 min, and more preferably 5 sec to 1 min.

The first conductive polymer and the second conductive polymer are preferably polyethylene oxide. When the first and second conductive polymers are polyethylene oxide, step (c) may be carried out in a manner in which the cathode and the composite solid electrolyte layer are stacked and pressurized at a pressure of 0.1 to 1.0 MPa at a temperature of 65 to 115° C., thus manufacturing the stack.

Upon manufacturing the stack, the pressurization is performed at a temperature equal to or higher than the melting temperature of the first conductive polymer and the second conductive polymer, whereby the first conductive polymer contained in the cathode and the second conductive polymer contained in the composite solid electrolyte layer are melted and then adhered to each other, thus improving the interfacial properties between the cathode and the composite solid electrolyte layer to thereby reduce the internal resistance of the battery.

Finally, an all-solid-state lithium secondary battery is manufactured by disposing an anode containing lithium metal on the composite solid electrolyte layer of the stack (step d).

After step (d), pressurizing the product of step (d) at a pressure of 0.1 to 1.0 MPa in the temperature range (T) of Expression 1 may optionally be further performed.

By means of the above pressurization process, the first conductive polymer contained in the cathode and the second conductive polymer contained in the composite solid electrolyte layer may be melted and then adhered to each other, and thus the resulting effects are as described in step (c).

Alternatively, a method of manufacturing an all-solid-state lithium secondary battery may include (a') manufacturing a cathode containing a cathode active material, a first LLZO, a first conductive polymer, a first lithium salt and a conductive material; (b') manufacturing a composite solid electrolyte layer containing a second LLZO, a second conductive polymer and a second lithium salt; (c') manufacturing a stack by disposing the cathode, the composite solid electrolyte layer on the cathode, and an anode containing lithium metal on the composite solid electrolyte layer; and (d') manufacturing an all-solid-state lithium secondary battery by pressurizing the stack at a pressure of 0.1 to 1.0 MPa in the temperature range (T) of Expression 1.

By means of the pressurization process, the first conductive polymer contained in the cathode and the second conductive polymer contained in the composite solid electrolyte layer may be melted and then adhered to each other, and thus the resulting effects are as described in step (c).

MODE FOR INVENTION

Examples

A better understanding of the present invention will be given through the following preferable examples, which are set forth to illustrate but are not to be construed as limiting the scope of the present invention.

Preparation Example 1: Preparation of Aluminum-Doped Lithium Lanthanum Zirconium Oxide (Al-LLZO)

As starting materials, lanthanum nitrate (La(NO$_3$)$_3$.6H$_2$O), zirconium nitrate (ZrO(NO$_3$)$_2$.2H$_2$O) and aluminum nitrate (Al(NO$_3$)$_3$.9H$_2$O) were dissolved in distilled water so that the molar ratio of La:Zr:Al was 3:2:0.25, thus preparing a 1 M starting material solution.

The starting material solution, 0.6 mol of ammonia water as a complexing agent, and an appropriate amount of sodium hydroxide aqueous solution were added via the inlet of a Couette-Taylor vortex reactor, thus obtaining a mixed solution having a pH of 11, which was then subjected to coprecipitation at a reaction temperature of 25° C. for 4 hr at a stirring rate of the stirring rod of 1,300 rpm to give a precursor slurry in a liquid slurry phase, which was then discharged through the outlet thereof. The Taylor number in the coprecipitation reaction of the Couette-Taylor vortex reactor was 640 or more.

The precursor slurry was washed with purified water and dried overnight. The dried precursor was pulverized using a ball mill, added with an excess of LiOH.H$_2$O, and mixed together using a ball mill, thus preparing a mixture. LiOH.H$_2$O of the mixture was added in an amount in excess of 3 wt % so that the Li content of LiOH.H$_2$O was 103 parts by weight based on 100 parts by weight of Li of the produced solid electrolyte. The mixture was calcined at 900° C. for 2 hr and then pulverized, thereby yielding aluminum-doped LLZO (Al-LLZO), Li$_{6.25}$La$_3$Zr$_2$Al$_{0.25}$O$_{12}$.

Preparation Example 2: Preparation of Composite Solid Electrolyte Layer (LLZO 30 wt %)

Al-LLZO and a polyethylene oxide (PEO) solid electrolyte binder were weighed such that the amount of Al-LLZO was 30 wt % based on the total weight (Al-LLZO+PEO) of Al-LLZO of Preparation Example 1 and PEO (average molecular weight: 200,000, melting temperature: 65° C.), and were then stirred at 2,000 rpm for 5 min using a Thinky mixer, thus preparing a mixture.

Here, the PEO solid electrolyte binder was a mixed solution including PEO, ACN and LiClO$_4$, and the amount of PEO was 25 wt % based on the total weight of the PEO solid electrolyte binder. Also, the PEO solid electrolyte binder was designed to have ionic conductivity, and the content ratio of PEO and LiClO$_4$ ([EO][Li]) was 15:1.

The mixture was mixed with ACN, and stirred using a Thinky mixer, and thus the viscosity thereof was adjusted to a proper level. Thereafter, the resulting mixture was added with zirconia balls having a size of 2 mm and stirred for 5 min at 2,000 rpm using a Thinky mixer, thus preparing a slurry. The slurry was cast on a PET (polyethylene terephthalate) film and dried at room temperature, thereby manufacturing a composite solid electrolyte layer having a thickness of 80 μm.

Preparation Example 3: Preparation of Composite Solid Electrolyte Layer (LLZO 50 wt %)

A composite solid electrolyte layer was manufactured in the same manner as in Preparation Example 2, with the exception that the amount of Al-LLZO was 50 wt % based on the total weight (Al-LLZO+PEO) of Al-LLZO of Preparation Example 1 and polyethylene oxide.

Preparation Example 4: Preparation of Composite Solid Electrolyte Layer (LLZO 70 wt %)

A composite solid electrolyte layer was manufactured in the same manner as in Preparation Example 2, with the exception that the amount of Al-LLZO was 70 wt % based on the total weight (Al-LLZO+PEO) of Al-LLZO of Preparation Example 1 and polyethylene oxide.

Preparation Example 5: Preparation of Composite Solid Electrolyte Layer (LLZO 90 wt %)

A composite solid electrolyte layer was manufactured in the same manner as in Preparation Example 2, with the exception that the amount of Al-LLZO was 90 wt % based on the total weight (Al-LLZO+PEO) of Al-LLZO of Preparation Example 1 and polyethylene oxide.

Preparation Example 6: Preparation of Polyethylene Oxide Film (LLZO 0 wt %)

A polyethylene oxide film was manufactured in the same manner as in Preparation Example 2, with the exception that the Al-LLZO of Preparation Example 1 was not added.

Preparation Example 7: Manufacture of Cathode

A cathode active material (lithium nickel cobalt manganese oxide, NMC), a conductive material (Super-P), a PEO binder and Al-LLZO of Preparation Example 1 were mixed at a weight ratio of 70:10:10:10 (wt %).

Here, the PEO binder was a mixed solution including PEO (Polyethylene Oxide, average molecular weight: 200,000, melting temperature: 65° C.), ACN and LiClO$_4$, and the amount of PEO was 25 wt % based on the total weight of the PEO binder. Also, the PEO binder was designed to have ionic conductivity, and the content ratio of PEO and LiClO$_4$ ([EO]:[Li]) was 15:1.

Specifically, NMC, Super-P and Al-LLZO of Preparation Example 1 were weighed at the above weight ratio and mixed for 30 min using a mortar and pestle, thus preparing a mixed powder. The mixed powder was placed in a vessel for a Thinky mixer and the PEO binder was also added thereto at the above weight ratio, after which the vessel was placed in the mixer, followed by mixing three times for 5 min at 2,000 rpm, thus preparing a mixture. Thereafter, the mixture was added with ACN (acetonitrile) to obtain appropriate viscosity, and was then added with zirconia balls and mixed at 2,000 rpm for 5 min, thus preparing a slurry. Finally, the slurry was cast on a piece of aluminum foil and dried in a vacuum oven at 60° C. for 24 hr, thereby manufacturing a cathode. The dry thickness thereof was adjusted to about 35 μm.

Preparation Example 8: Manufacture of Cathode

A cathode was manufactured in the same manner as in Preparation Example 3, with the exception that the mixing weight ratio of NMC:Super-P:PEO binder:Al-LLZO was set to 60:10:10:20 instead of 70:10:10:10, which is the mixing weight ratio of NMC:Super-P:PEO binder:Al-LLZO.

Preparation Example 9: Manufacture of Cathode

NMC, Super-P and an 8% PVDF (poly-1,1-difluoroethene) solution were weighed at a weight ratio (wt %) of 80:10:10 based on the solid content thereof and were then mixed to give a mixture. The mixture was stirred at 2,000 rpm for 5 min using a Thinky mixer, added with NMP (n-methyl-2-pyrrolidone), and further stirred using a Thinky mixer to obtain appropriate viscosity. Thereafter, the resulting mixture was added with zirconia balls having a size of 2 mm and stirred at 2,000 rpm for 5 min using a Thinky mixer, thus preparing a slurry. The slurry was cast on a piece of aluminum foil using a glass rod and then dried in an oven at 110° C. for 24 hr, thereby manufacturing a cathode. The dry thickness thereof was adjusted to about 15 μm.

[Manufacture of all-Solid-State Lithium Secondary Battery]

Example 1

The cathode of Preparation Example 7 and the composite solid electrolyte layer of Preparation Example 4 were punched at a size of ϕ16 and then stacked. Next, heating at about 70 to 80° C. and pressurization at a pressure of 0.3 MPa for about 10 sec were performed, thus manufacturing a stack. Lithium metal was placed on the stack, thereby manufacturing an all-solid-state lithium secondary battery as a 2032 coin cell.

Example 2

An all-solid-state lithium secondary battery was manufactured in the same manner as in Example 1, with the exception that the cathode of Preparation Example 8 was used in lieu of the cathode of Preparation Example 7.

Comparative Example 1

An all-solid-state lithium secondary battery was manufactured in the same manner as in Example 1, with the exception that the cathode of Preparation Example 9 was used in lieu of the cathode of Preparation Example 7.

Test Examples

Test Example 1: Measurement of Charge/Discharge Characteristics (Change in Cathode Binder)

FIG. 2(a) shows the charge/discharge characteristics of the all-solid-state lithium secondary battery of Example 1 measured at 55° C. with current of 0.1 C, and FIG. 2(b) shows the charge/discharge characteristics of the all-solid-state lithium secondary battery of Comparative Example 1 measured at 70° C. with current of 0.1 C.

Figure 2:
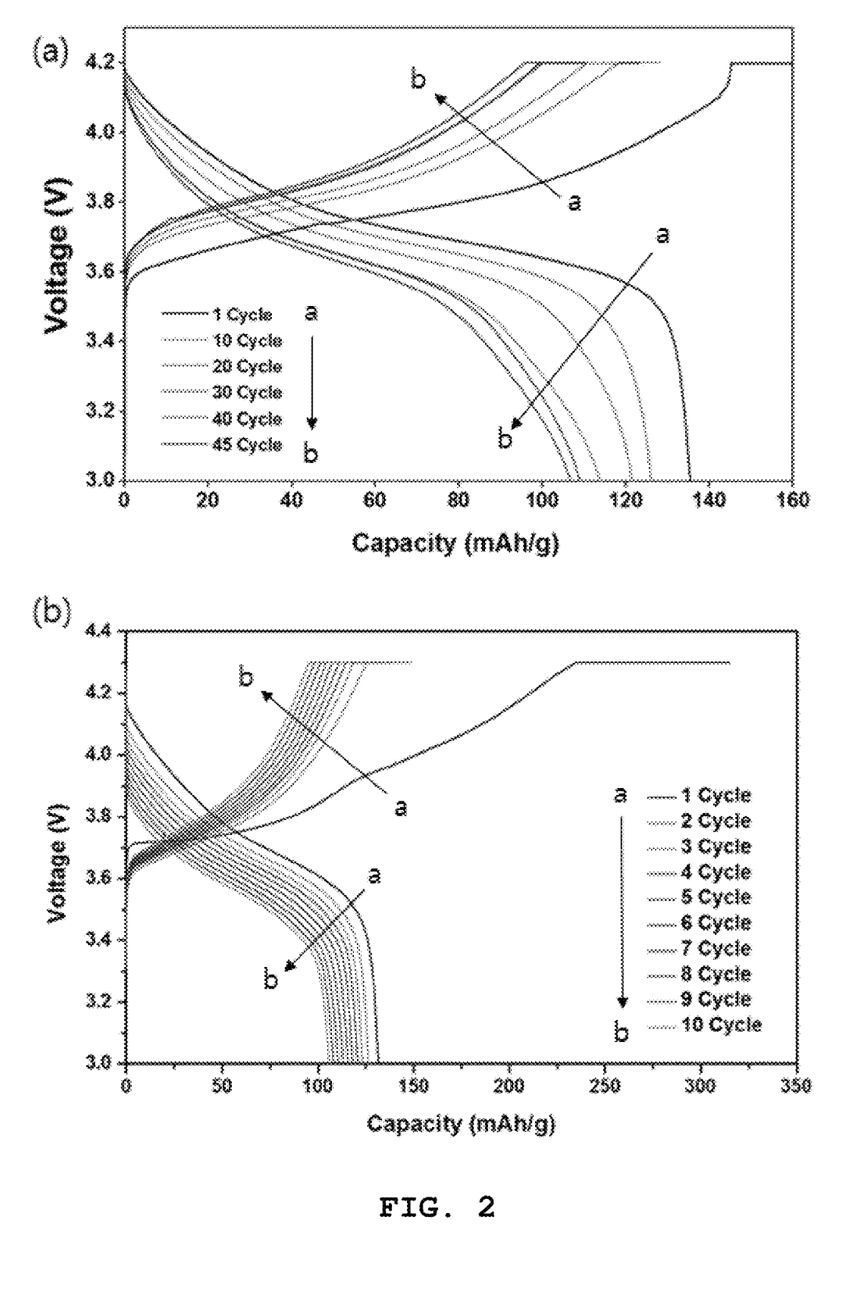
FIG. 2 shows the results of measurement of charge/discharge characteristics of all-solid-state lithium secondary batteries of Example 1 and Comparative Example 1.

With reference to FIG. 2, the all-solid-state lithium secondary battery of Example 1 exhibited an initial discharge capacity of about 130 mAh/g or more at 55° C. and maintained a discharge capacity of about 83% at 45 cycles. However, the all-solid-state lithium secondary battery of Comparative Example 1 was reduced in cycle capacity compared to the all-solid-state lithium secondary battery of Example 1.

Therefore, the all-solid-state lithium secondary battery of Example 1, including the cathode containing the conductive polymer PEO and the solid electrolyte LLZO, was greatly improved in cycle characteristics compared to the all-solid-state lithium secondary battery of Comparative Example 1, which included the cathode containing PVDF.

Test Example 2: Measurement of Discharge Capacity Upon Cycling

Figure 3:
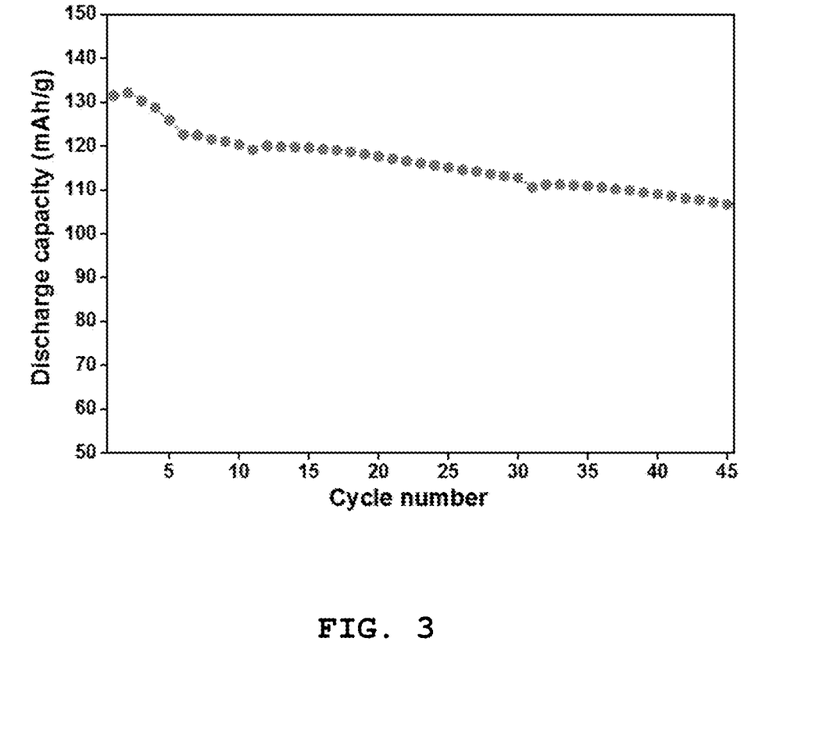
FIG. 3 shows the results of measurement of the discharge capacity of the all-solid-state lithium secondary battery of Example 1 upon cycling at 55° C.

FIG. 3 shows the results of measurement of discharge capacity of the all-solid-state lithium secondary battery of Example 1 upon cycling at 55° C.

With reference to FIG. 3, the all-solid-state lithium secondary battery of Example 1 maintained a discharge capacity of about 83% at 45 cycles.

Accordingly, the all-solid-state lithium secondary battery of Example 1 was found to have superior discharge capacity.

Test Example 3: Measurement of Charge/Discharge Characteristics (Change in Cathode Composition)

FIG. 4(a) shows the charge/discharge characteristics of the all-solid-state lithium secondary battery of Example 1 measured at 70° C. with current of 0.1 C, and FIG. 4(b) shows the charge/discharge characteristics of the all-solid-state lithium secondary battery of Example 2 measured at 70° C. with current of 0.1 C.

Figure 4:
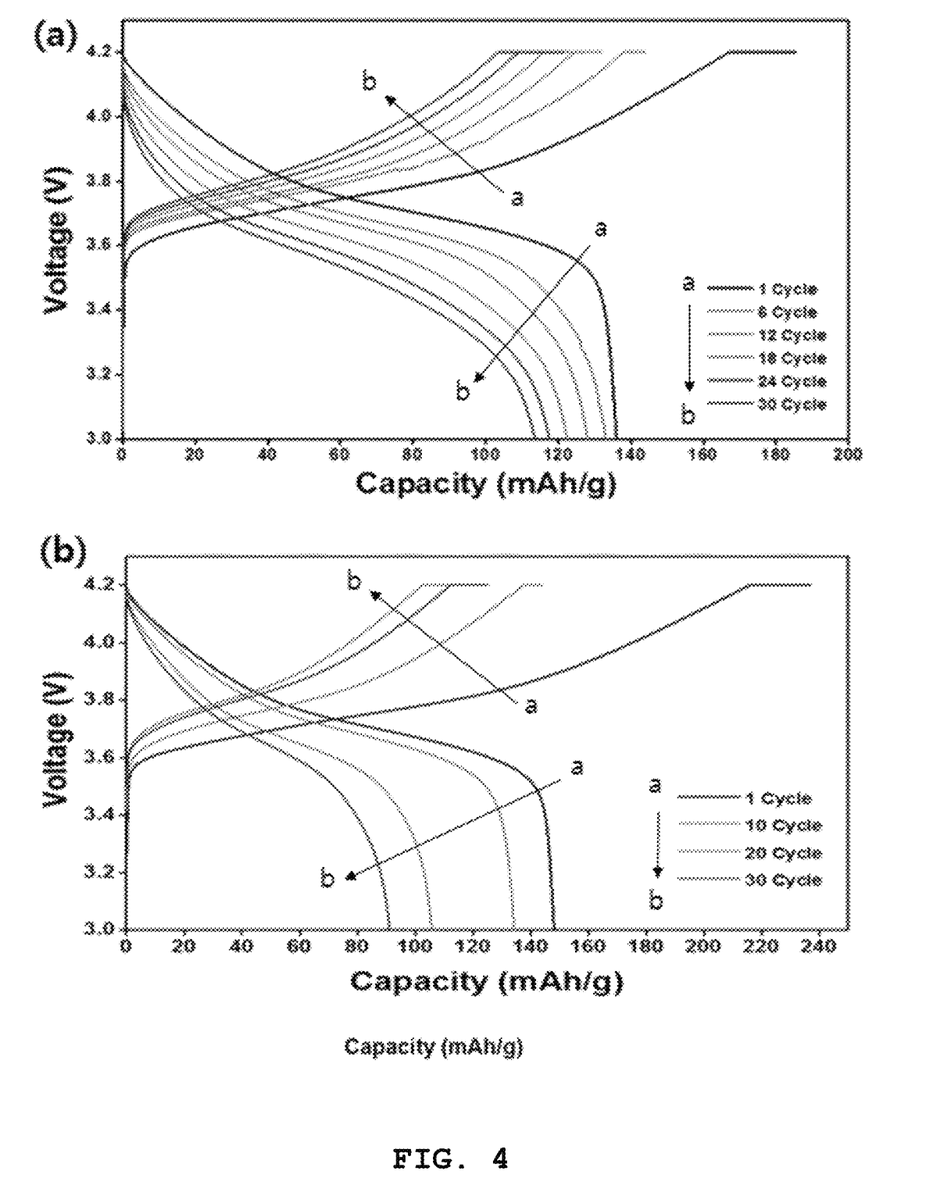
FIG. 4 shows the results of measurement of charge/discharge characteristics of the all-solid-state lithium secondary batteries of Examples 1 and 2 at 70° C.

With reference to FIG. 4, the all-solid-state lithium secondary battery of Example 1 exhibited a slightly increased initial discharge capacity at 70° C. compared to 55° C. and maintained a discharge capacity of 85% at 30 cycles. Also, the all-solid-state lithium secondary battery of Example 2 exhibited a superior initial discharge capacity of about 150 mAh/g, but a reduction in the capacity thereof was increased with an increase in the number of charge/discharge cycles.

Therefore, the all-solid-state lithium secondary battery of Example 1 slowed the degradation of an all-solid-state lithium secondary battery even at a high temperature of 70° C., and was superior in initial discharge capacity and cycle characteristics compared to 55° C. Furthermore, the cycle characteristics thereof were further improved compared to the all-solid-state lithium secondary battery of Example 2.

Test Example 4: Measurement of Impedance

Figure 5:
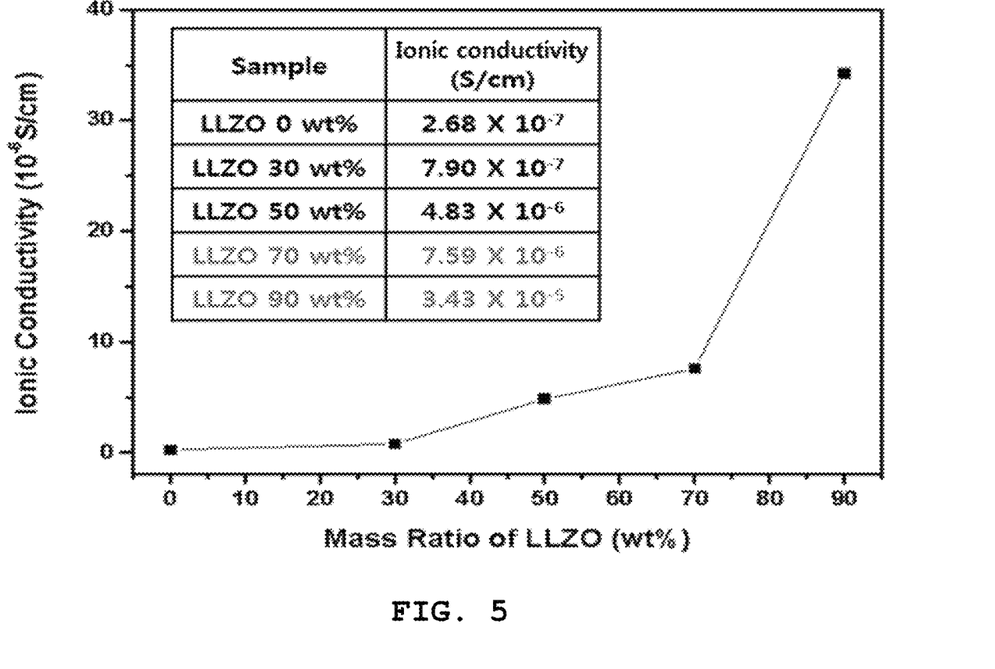
FIG. 5 shows the results of measurement of impedance of composite solid electrolyte layers of Preparation Examples 2 to 5 and a polyethylene oxide film of Preparation Example 6.

FIG. 5 shows the results of calculation of ionic conductivity from impedance measured under conditions of 7 MHz-100 mHz and 5 mV after mounting of a SUS jig with each of the composite solid electrolyte layers of Preparation Examples 2 to 5 and the polyethylene oxide film of Preparation Example 6 at room temperature.

With reference to FIG. 5, the polyethylene oxide film of Preparation Example 6, containing no LLZO, exhibited an ionic conductivity of $2.68 \times 10^{-7}$ S/cm. When the amount of Al-LLZO in the composite solid electrolyte layers of Preparation Examples 2 to 5 was increased to 30, 50, 70, and 90 wt %, the conductivity values were increased to $7.9 \times 10^{-7}$, $4.83 \times 10^{-6}$, $7.59 \times 10^{-6}$, and $3.43 \times 10^{-5}$ S/cm, respectively.

Thus, it can be confirmed that the ionic conductivity of the composite solid electrolyte layer was increased with an increase in the amount of Al-LLZO.

Test Example 5: Measurement of Oxidation-Reduction Behavior

Figure 6:
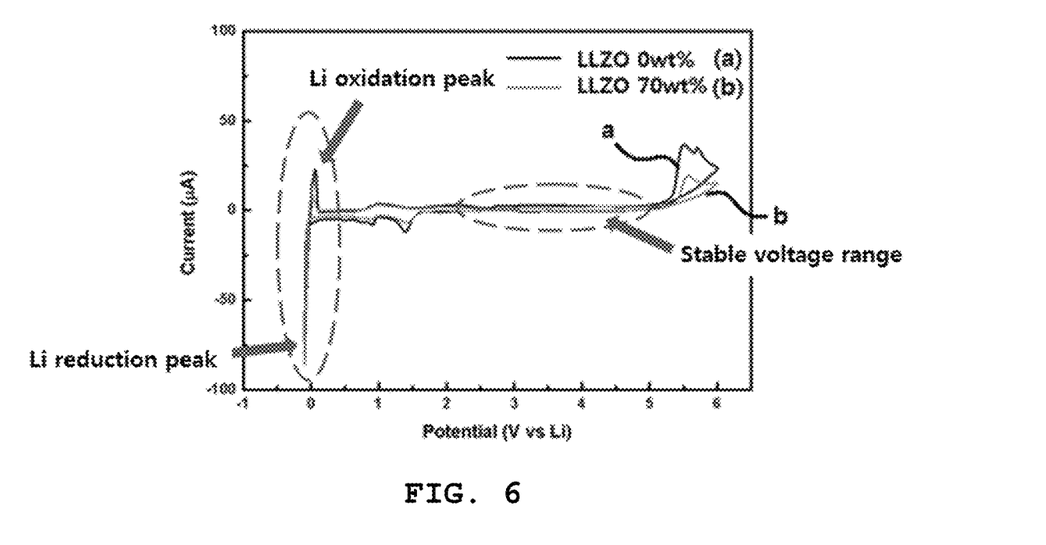
FIG. 6 shows the results of measurement of oxidation-reduction behavior of electrochemical cells using the polyethylene oxide film of Preparation Example 6 and the composite solid electrolyte layer of Preparation Example 4.

FIG. 6 shows the results of measurement of oxidation-reduction behavior in electrochemical cells using the polyethylene oxide film of Preparation Example 6 and the composite solid electrolyte layer of Preparation Example 4.

In order to evaluate electrochemical potential stability by measuring the oxidation-reduction behavior, electrochemical cells using the polyethylene oxide film and the composite solid electrolyte layer were manufactured and subjected to cyclic voltammetry. The operating electrode of the electrochemical cells was made of SUS, and the counter electrode was made of lithium metal.

With reference to FIG. 6, the electrochemical cells using the polyethylene oxide film of Preparation Example 6 and the composite solid electrolyte layer of Preparation Example 4 exhibited safe electrochemical reactivity up to about 5V. In particular, in the electrochemical cell using the composite solid electrolyte layer of Preparation Example 4, the polymer decomposition oxidation potential was further shifted in the (+) direction, and thus, when the amount of Al-LLZO that was added was increased, the electrochemical potential window was further increased.

Test Example 6: Measurement of Discharge Capacity of Coin Cell Depending on PEO/LLZO Amount of Composite Solid Electrolyte Layer FIG. 7 shows the results of measurement of the discharge capacity of coin cells using the composite solid electrolyte layers of Preparation Examples 2 to 5 and the polyethylene oxide film of Preparation Example 6.

In order to measure the discharge capacity, 2032 coin cells, including the composite solid electrolyte layers of Preparation Examples 2 to 5, the polyethylene oxide film of Preparation Example 6, the cathode of Preparation Example 9, and the lithium metal anode, were subjected to charge/discharge testing at a current density of 0.1 C.

Figure 7:
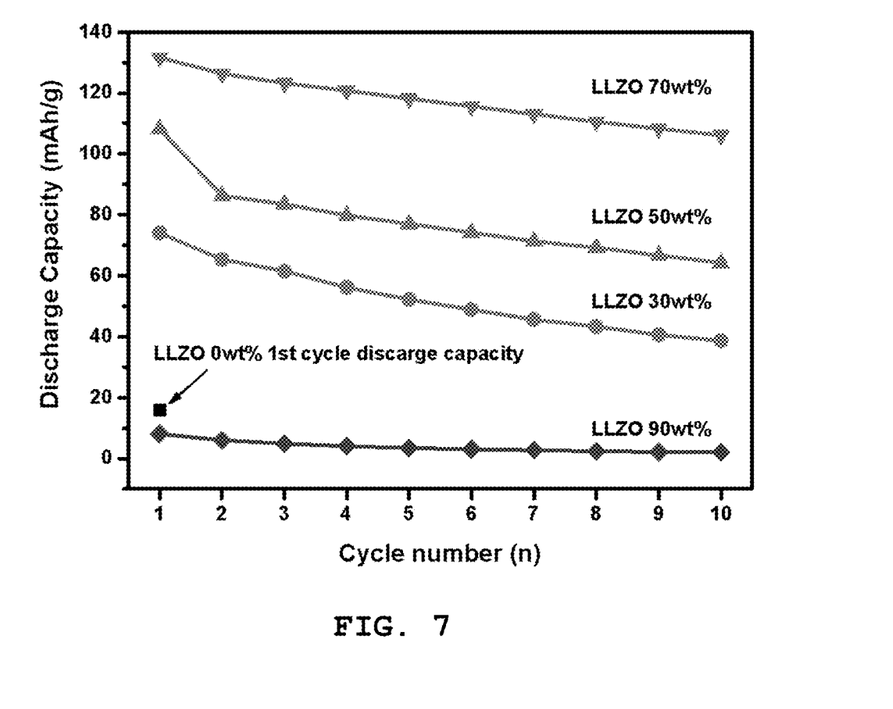
FIG. 7 shows the results of measurement of the discharge capacity of coin cells using the composite solid electrolyte layers of Preparation Examples 2 to 5 and the polyethylene oxide film of Preparation Example 6.

With reference to FIG. 7, the capacity was increased with an increase in the amount of Al-LLZO of the composite solid electrolyte layer, and the cycle characteristics were also improved. In particular, the characteristics of the coin cell using the composite solid electrolyte layer (70 wt % of Al-LLZO) of Preparation Example 4 were superior, which is deemed to be because the interfacial control of the coin cell using the composite solid electrolyte layer of Preparation Example 4 is excellent.

Consequently, the formation of the composite solid electrolyte layer such that the amount of Al-LLZO is 70 wt % based on the total weight (Al-LLZO+PEO) of Al-LLZO and polyethylene oxide can be found to be preferable.

The scope of the invention is represented by the claims below rather than the aforementioned detailed description, and all changes or modified forms that are capable of being derived from the meaning, range, and equivalent concepts of the appended claims should be construed as being included in the scope of the present invention.

INDUSTRIAL APPLICABILITY

Unlike the related art, an all-solid-state lithium secondary battery according to the present invention is configured such that both a cathode and a composite solid electrolyte layer contain a conductive polymer, a lithium salt and an inorganic ceramic solid electrolyte, thus improving discharge capacity and cycle characteristics.

In addition, in a method of manufacturing an all-solid-state lithium secondary battery according to the present invention, the all-solid-state lithium secondary battery including a cathode and a composite solid electrolyte layer, both of which contain a conductive polymer, a lithium salt and an inorganic ceramic solid electrolyte, is manufactured in a non-sintering manner, thus reducing manufacturing costs and controlling interfacial reactions between active materials, between solid electrolyte particles, and between an electrolyte and an electrode, thereby further reducing the internal resistance of the battery.

What is claimed is:

1. An all-solid-state lithium secondary battery, comprising:
    a cathode containing a cathode active material, a first LLZO, a first conductive polymer, a first lithium salt and a conductive material;
    an anode containing lithium metal; and
    a composite solid electrolyte layer disposed between the cathode and the anode and configured to contain a second LLZO, a second conductive polymer and a second lithium salt,
    wherein the first LLZO and the second LLZO are each independently aluminum-doped LLZO or aluminum-undoped LLZO,
    the undoped LLZO is represented by Chemical Formula 1 below, and
    the doped LLZO is represented by Chemical Formula 2 below;

$Li_xLa_yZr_7O_{12}$ (6≤x≤9, 2≤y≤4, 1≤z≤3)

$Li_xLa_yZr_7Al_wO_{12}$ (5≤x≤9, 2≤y≤4, 1≤z≤3, 0<w≤1) and wherein the first conductive polymer and the second conductive polymer are each independently polyethylene oxide having an average molecular weight of 500 to 1,000,000.

2. The all-solid-state lithium secondary battery of claim 1, wherein the first LLZO and the second LLZO are each independently aluminum-doped LLZO.

3. The all-solid-state lithium secondary battery of claim 2, wherein the aluminum-doped LLZO has a garnet crystal structure.

4. The all-solid-state lithium secondary battery of claim 1, wherein the cathode includes, based on 100 parts by weight of the cathode active material, 5 to 50 parts by weight of the first LLZO, 5 to 25 parts by weight of the first conductive polymer, and 5 to 25 parts by weight of the conductive material, and
    wherein the composite solid electrolyte layer includes, based on 100 parts by weight of the second LLZO, 1 to 300 parts by weight of the conductive polymer.

5. The all-solid-state lithium secondary battery of claim 1, wherein the first conductive polymer and the second conductive polymer each independently include a polymer selected from the group consisting of polyethylene oxide, polyethylene glycol, polypropylene oxide, polyphosphazene, polysiloxane, and copolymers thereof.

6. The all-solid-state lithium secondary battery of claim 1, wherein the cathode active material is a Ni—Co—Mn ternary lithium metal oxide (NMC) represented by Chemical Formula 3 below:

$LiNi_pCo_qMn_rO_2$, where 0<p<0.9, 0<q<0.5, 0<r<0.5, and p+q+r=1.

7. The all-solid-state lithium secondary battery of claim 1, wherein the conductive material is selected from the group consisting of carbon black, acetylene black, and KETJEN-BLACK, and combinations thereof.

8. The all-solid-state lithium secondary battery of claim 1, wherein the first lithium salt and the second lithium salt are each independently selected from the group consisting of lithium perchlorate ($LiClO_4$), lithium triflate ($LiCF_3SO_3$), lithium hexafluorophosphate ($LiPF_6$), lithium tetrafluoroborate ($LiBF_4$), and lithium trifluoromethanesulfonyl imide ($LiN(CF_3SO_2)_2$) and combinations thereof.

9. The all-solid-state lithium secondary battery of claim 1, wherein the all-solid-state lithium secondary battery comprises:
    a cathode containing aluminum-doped LLZO, polyethylene oxide, a Ni—Co—Mn ternary lithium metal oxide (NMC), lithium perchlorate ($LiClO_4$) and carbon black;
    an anode containing a lithium metal; and
    a composite solid electrolyte layer disposed between the cathode and the anode and configured to contain aluminum-doped LLZO, polyethylene oxide and lithium perchlorate ($LiClO_4$).

10. A method of manufacturing an all-solid-state lithium secondary battery, comprising:
    (a') manufacturing a cathode containing a cathode active material, a first LLZO, a first conductive polymer, a first lithium salt and a conductive material;
    (b') manufacturing a composite solid electrolyte layer containing a second LLZO, a second conductive polymer and a second lithium salt;
    (c') manufacturing a stack by disposing the cathode, the composite solid electrolyte layer on the cathode, and an anode containing lithium metal on the composite solid electrolyte layer; and
    (d') manufacturing an all-solid-state lithium secondary battery by pressurizing the stack at a pressure of 0.1 to 1.0 MPa in a temperature range (T) of Expression 1 below:

$T_m ≤ T ≤ T_m + 50°$ C., where $T_m = T_{m1}$ when $T_{m1} > T_{m2}$, $T_m = T_{m2}$ when $T_{m1} < T_{m2}$, and $T_m = T_{m1}$ when $T_{m1} = T_{m2}$, and
    where $T_{m1}$ is a melting temperature of the first conductive polymer and $T_{m2}$ is a melting temperature of the second conductive polymer.

11. A method of manufacturing an all-solid-state lithium secondary battery, comprising:
  (a) manufacturing a cathode containing a cathode active material, a first LLZO, a first conductive polymer, a first lithium salt and a conductive material;
  (b) manufacturing a composite solid electrolyte layer containing a second LLZO, a second conductive polymer and a second lithium salt;
  (c) manufacturing a stack by stacking the cathode and the composite solid electrolyte layer; and
  (d) disposing an anode containing lithium metal on the composite solid electrolyte layer of the stack,
  wherein step (c) is performed in a manner in which the cathode and the composite solid electrolyte layer are stacked and pressurized at a pressure of 0.1 to 1.0 MPa in a temperature range (T) of Expression 1 below, thus manufacturing the stack:

$$T_m \leq T \leq T_m + 50° C. \quad \text{[Expression 1]}$$

where $T_m = T_{m1}$ when $T_{m1} > T_{m2}$, $T_m = T_{m2}$ when $T_{m1} < T_{m2}$ and $T_m = T_{m1}$ when $T_{m1} = T_{m2}$, and
  where $T_{m1}$ is a melting temperature of the first conductive polymer and $T_{m2}$ is a melting temperature of the second conductive polymer.

12. The method of claim 11, wherein the first conductive polymer and the second conductive polymer are polyethylene oxide, and step (c) is performed in a manner in which the cathode and the composite solid electrolyte layer are stacked and pressurized at a pressure of 0.1 to 1.0 MPa at a temperature of 65° C. (a melting temperature of polyethylene oxide) to 115° C., thus manufacturing the stack.

13. The method of claim 11, further comprising pressurizing a product of step (d) at a pressure of 0.1 to 1.0 MPa in a temperature range (T) of Expression 1 below:

$$T_m \leq T \leq T_m + 50° C.,$$

where $T_m = T_{m1}$ when $T_{m1} > T_{m2}$, $T_m = T_{m2}$ when $T_{m1} < T_{m2}$, and $T_m = T_{m1}$ when $T_{m1} = T_{m2}$, and
  where $T_{m1}$ is a melting temperature of the first conductive polymer and $T_{m2}$ is a melting temperature of the second conductive polymer.

14. The method of claim 11, wherein step (a) is performed in a manner in which the cathode active material, the LLZO, the first conductive polymer, the first lithium salt and the conductive material are mixed to give a slurry, and the slurry is cast and then dried, thus manufacturing the cathode.

* * * * *